United States Patent
Saïb et al.

(10) Patent No.: US 10,423,074 B2
(45) Date of Patent: Sep. 24, 2019

(54) METHOD FOR CALCULATING THE METRICS OF AN IC MANUFACTURING PROCESS

(71) Applicants: COMMISSARIAT A L'ENERGIE ATOMIQUE ET AUX ENERGIES ALTERNATIVES, Paris (FR); ASELTA NANOGRAPHICS, Grenoble (FR)

(72) Inventors: Mohamed Saïb, Saint Martin d'Heres (FR); Aurélien Fay, Grenoble (FR); Patrick Schiavone, Villard-Bonnot (FR); Thiago Figueiro, Grenoble (FR)

(73) Assignees: ASELTA NANOGRAPHICS, Grenoble (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/310,709

(22) PCT Filed: Jun. 2, 2015

(86) PCT No.: PCT/EP2015/062301
§ 371 (c)(1),
(2) Date: Nov. 11, 2016

(87) PCT Pub. No.: WO2015/185576
PCT Pub. Date: Dec. 10, 2015

(65) Prior Publication Data
US 2017/0123322 A1    May 4, 2017

(30) Foreign Application Priority Data

Jun. 3, 2014 (EP) .................................. 14305834

(51) Int. Cl.
*G06F 17/50* (2006.01)
*G03F 7/20* (2006.01)
(Continued)

(52) U.S. Cl.
CPC ................ *G03F 7/705* (2013.01); *G03F 1/36* (2013.01); *G03F 1/80* (2013.01); *G03F 7/70441* (2013.01);
(Continued)

(58) Field of Classification Search
CPC ....................................................... G06F 17/50
(Continued)

(56) References Cited

U.S. PATENT DOCUMENTS 9,977,075 B1    5/2018  Connor et al.
2006/0075378 A1  4/2006  Beale et al.
(Continued)

*Primary Examiner* — Suresh Memula
(74) *Attorney, Agent, or Firm* — Baker & Hostetler LLP

(57) ABSTRACT

A method for calculating the parameters of a resist model of an IC manufacturing process is provided. Accordingly, a function representative of the target design convoluted throughout the whole target design with a kernel function compounded with a deformation function with a shift angle. The deformation function is replaced by its Fourier series development, the order of which is selected so that the product of convolution is invariant through rotations within a tolerance of the corrections to be applied to the target design. Alternatively, the product of convolution may be decomposed into basic kernel functions selected varying by angles determined so that a deformation function for a value of the shift angle can be projected onto a couple of basic kernel functions the angles of which are proximate to the shift angle.

16 Claims, 8 Drawing Sheets

(51) Int. Cl.
*G03F 1/36* (2012.01)
*G03F 1/80* (2012.01)
*H01J 37/317* (2006.01)

(52) U.S. Cl.
CPC ...... *G06F 17/5081* (2013.01); *H01J 37/3174* (2013.01); *G06F 2217/12* (2013.01); *Y02P 90/265* (2015.11)

(58) Field of Classification Search
USPC .......................................................... 716/51
See application file for complete search history.

(56) References Cited

U.S. PATENT DOCUMENTS

| | | |
|---|---|---|
| 2010/0269084 A1 | 10/2010 | Granik |
| 2011/0138343 A1 | 6/2011 | Granik |
| 2011/0213977 A1* | 9/2011 | Little .................... H04L 9/0844 713/171 |
| 2012/0221982 A1 | 8/2012 | Jeong et al. |
| 2017/0075225 A1* | 3/2017 | Sa B .................... G03F 7/70458 |
| 2017/0123322 A1* | 5/2017 | Sa B ......................... G03F 1/36 |
| 2017/0315507 A1* | 11/2017 | Collings ............ H04Q 11/0005 |

\* cited by examiner

METHOD FOR CALCULATING THE METRICS OF AN IC MANUFACTURING PROCESS

CROSS-REFERENCE TO RELATED APPLICATIONS

This application is a National Stage of International patent application PCT/EP2015/062301, filed on Jun. 2, 2015, which claims priority to foreign European patent application No. EP 14305834.5, filed on Jun. 3, 2014, the disclosures of which are incorporated by reference in their entirety.

FIELD OF THE INVENTION

The present invention notably applies to the field of electronic or optical lithography. It applies, among other processes, to mask write and direct write. It can also apply to other steps of semiconductor manufacturing processes, such as nanoimprint, DSA (Directed Self Assembly), etching, CMP (Chemical Mechanical Polishing/Planarization), annealing, baking, metrology, etc. . . . .

BACKGROUND

During the process of mask write or direct write, several factors contribute to induce errors and prevent the achievement of the expected pattern fidelity. Some of these factors are the electron scattering (forward and backward), resist diffusion, resist thickness, etching, flare, fogging, metrology, etc. In order to improve the resolution and reduce the impact of these phenomena, there are several strategies of proximity effect correction (PEC), fogging effect correction (FEC), etching compensation, among others. The strategies are based on a prediction of the impact of each effect of a correction of these by means of dose and/or geometry compensation. Therefore, the quality of the correction depends upon the quality of the models used to predict the phenomena, said models being different from one manufacturing process to another. High precision of the model and the corrections can certainly be obtained, but at a high computation cost.

It has become common knowledge to use a decomposition of the model into two models, a first one to compute the corrections of the electronic proximity effects, and a second one to compute all the other corrections, often called the residual model or the resist model. The parameters of the residual model have to be calculated from the characteristics of the target design, so that the model accurately represents the differences between the various pattern configurations in the design. Space, CD and density normally give a good representation of these differences, but other are sometimes used, such as the exploration variables disclosed by Granik (Y. Granik, N. Cobb, "New Process Models for OPC at sub-90 nm Nodes", Optical Microlithography XVI, proc. SPIE vol 5040, 2010).

Tools that can be used to calculate representative variables in the residual models are the visibility kernels, such as those disclosed by Sato (S. Sato, K. Ozawa, and F. Uesawa, "Dry-etch proximity function for model-based OPC beyond 65-nm node", proc. SPIE vol 6155, 2006), or Park (J.-G. Park, S.-W. Kim, S.-B. Shim, S.-S. Suh, and H.-K. Oh, "The effective etch process proximity correction methodology for improving on chip CD variation in 20 nm node DRAM gate', Design for Manufacturability though Design-Process Integration V, proc. SPIE vol 7974, 2011).

Also, US patent applications published under no. US2010/269084 and US2011/138343 disclose visibility kernels to scan semiconductor designs.

The methods to implement these methods require the calculation of surface integrals within limits which vary with each part of the design under visibility. Also, the number of calculations is multiplied by the number of variables because CD and Space, and density, notably, each require a full surface integral calculation at all the points of interest.

There is therefore a need of an improvement of the kernel models which greatly alleviates the computation load, while giving an accurate representation of the variables.

SUMMARY OF THE INVENTION

The invention solves this problem and alleviates the computing workload by calculating the metrics of the model by products of convolution of the target design and a new type of method wherein a kernel function is oriented by a deformation function using a shift angle and the characteristics of the design of the integrated circuit to be manufactured are calculated using a convolution across the whole design.

To this effect, the invention discloses A method of determining, by a computer, at least a component of a vector representing a metric of a process for manufacturing a semiconductor integrated circuit defined by a target design, said method being characterized in that it comprises: selecting at least a point of the target design as a point of interest (x,y); selecting a kernel function K(r) centered on the at least a point of interest, said kernel function depending on a radius; calculating over the target design at least a convolution of the target design and a compound of the kernel function K(r) and a deformation function $f_{x,y}(\theta, \varphi_{x,y})$, said deformation function depending on the angle of interest and a selected shift angle $\varphi_x$ determining a value of the at least a component V(x,y) from the value of the convolution function at the at least a point of interest (x,y).

Advantageously, the at least a component is an external density of the target design at the point of interest, which is determined from a convolution function where the shift angle $\varphi_{x,y}$ is selected to scan outside parts of the design from the point of interest.

Advantageously, the at least a component is an internal density of the target design at the point of interest, which is determined from a convolution function where the shift angle $\varphi_{x,y}'$ is selected to scan inside parts of the design from the point of interest.

Advantageously, the shift angle $\varphi_{x,y}'$ is equal to $\varphi_{x,y}+\pi$ Advantageously, the kernel function is an isotropic function.

Advantageously, the kernel function is a Gaussian function.

Advantageously, the deformation function is a compound of trigonometric functions selected to be null for values of the angle of interest higher than $\pi$.

Advantageously, the deformation function is a compound of one of squares and cubic powers of trigonometric functions selected to be null for values of the angle of interest higher than $\pi$.

Advantageously, the deformation function is replaced by a Fourier series development.

Advantageously, the Fourier series development is developed at a $n^{th}$ order, n being selected so that the product of convolution developed at the $n^{th}$ order is invariant across rotations around the point of interest, within a tolerance of the corrections to be applied to the target design.

Advantageously, the deformation function is replaced by a projection of a couple of basic kernel functions, said basic kernel functions with angular variations selected to scan the domain of variation of the shift angle $\varphi_{x,y}$ across the target design.

Advantageously, the couple of basic kernel functions is selected so that the two selected basic kernel functions have angular variations which are above and under shift angle $\varphi_{x,y}$.

The invention also discloses a computer program for determining at least a component of a vector representing a metric of a process for manufacturing a semiconductor integrated circuit defined by a target design, said computer program being characterized in that it comprises: computer code for selecting at least a point of the target design as a point of interest; computer code for selecting a kernel function centered on the at least a point of interest, said kernel function depending on a radius; computer code for calculating over the target design at least a convolution function of the target design and a compound of the kernel function and a deformation function, said deformation function depending on the angle of visibility and a selected shift angle; computer code for determining a value of the at least a component from the value of the convolution function at the at least a point of interest.

The invention also discloses a semiconductor manufacturing equipment configured to use at least an output of a computer program according to the invention, said semiconductor manufacturing equipment configured for one of direct writing on semiconductor wafers, writing on a mask plate, etching, chemically or mechanically planarizing, or baking, annealing a semiconductor wafer, and inspecting a mask or semiconductor surface.

Another advantage of the invention is that a calculation of the product of convolution can still be quickened by using, instead of the deformation function, its development in Fourier series at an adequate order. Alternatively a decomposition of the product of convolution using a projection on an angular basis can also improve the speed of calculation. And in all cases, the use of a product of convolution allows a very effective factorization which again alleviates the computing workload. Also, the use of a shift angle is specifically advantageous in the case of free-form designs, for which the use of surface integrals is quasi impossible. In this case, simple rules can be used to adapt the optimal shift angle when going along the contour of a design to model.

BRIEF DESCRIPTION OF THE DRAWINGS

The invention will be better understood and its various features and advantages will become apparent from the description of various embodiments and of the following appended figures.

DETAILED DESCRIPTION

Figure 1C:
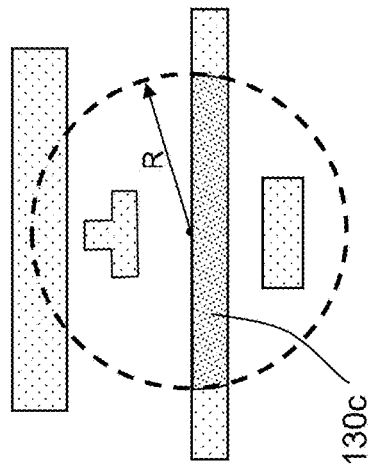
FIGS. 1a, 1b and 1c represent an isotropic kernel function, and its implementation to define an external visible surface and an internal visible surface, in a method of the prior art.
Figure 1B:
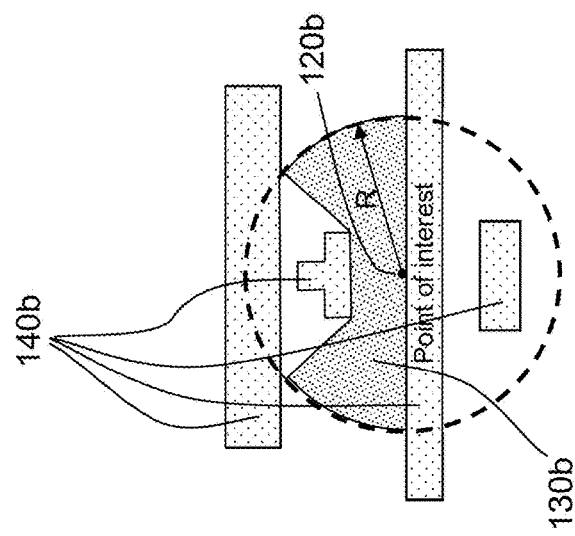
Figure 1A:
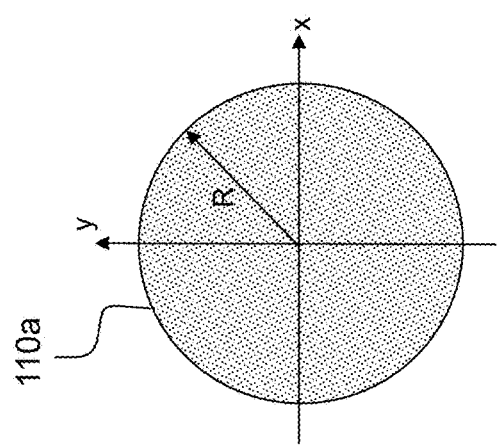

FIGS. 1a, 1b and 1c represent an isotropic kernel function, and its implementation to define an external visible surface and an internal visible surface, in a method of the prior art.

FIG. 1a illustrates an isotropic area of interest 110a, which has a radius R.

FIG. 1b illustrates an intersection 130b of the area of visibility 110a from a point of interest 120b with a set of target patterns 140b. This intersection is external to the set of target patterns and can be used, as explained below to define the Space variable as the ratio of the surface of the intersection 130b to the surface of the area of visibility 110a.

FIG. 1c illustrates an intersection 130c of the area of visibility 110a from a point of interest 120b with a set of target patterns 140b. This intersection is internal to the set of target patterns and can be used, as explained below to define the CD variable as the ratio of the surface of the intersection 130c to the surface of the area of visibility 110a.

The surface 130b, 130c, is calculated using a double integral within the area of visibility 110a of a convolution of the target design, represented by a function of the radius and an angle, $T(r,\theta)$ with a Gaussian kernel function $K(r)$:

$$S = \iint K(r) \cdot T(r,\theta) \cdot dr d\theta$$

Notice that $\iint$ is the double integral bounded by the visible range viewed from point of interest. As shown in FIGS. 1b, 1c, the boundary of the integral changes radically when the point of interest is moved, even of a few nanometers. Therefore, no factorization is possible and the calculation of the surface cannot be optimized for intensive computing.

In the case of a calculation of Space (visibility kernel), $T(r,\theta)$ is null inside the plain parts of the layout and non-zero elsewhere.

In the case of a calculation of CD (blocked kernel), $T(r,\theta)$ is null outside the plain parts of the layout and non-zero elsewhere.

The domain of integration is the surface which is visible from the point of interest. It is therefore to be noted that the limits of the domain of integration vary with each piece of the layout (i.e. with each point of interest) and that the procedure has to be repeated for all the points of interest (there may be as many as a few billions, in the case of complex layouts).

Figure 2C:
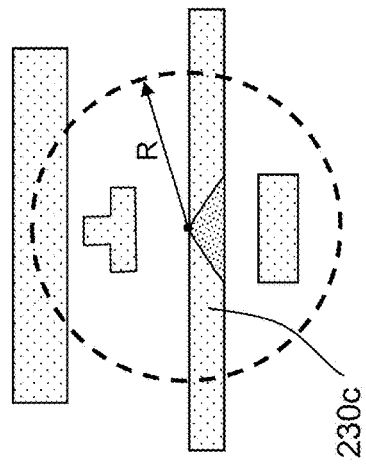
FIGS. 2a, 2b and 2c represent an anisotropic kernel function, and its implementation to define an external visible surface and an internal visible surface, in another method of the prior art.
Figure 2B:
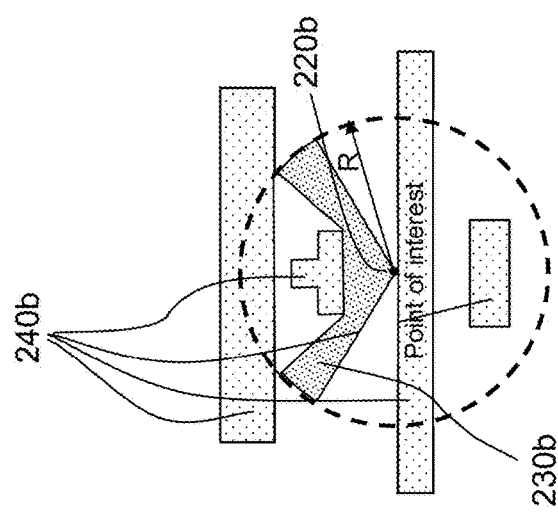
Figure 2A:
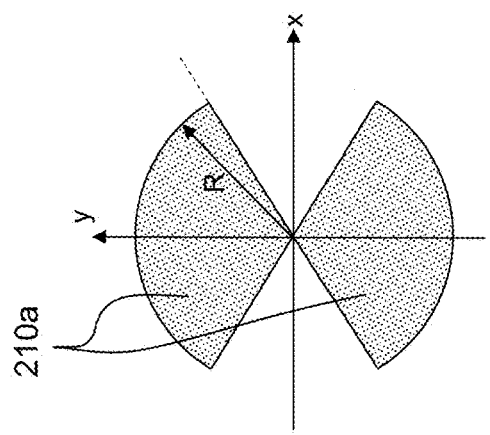

FIGS. 2a, 2b and 2c represent an anisotropic kernel function, and its implementation to define an external visible surface and an internal visible surface, in another method of the prior art.

These figures represent a variant of the previous art embodiment, wherein a deformation function, defined by an angle θ is introduced.

FIG. 2a illustrates an anisotropic area of simulation 210a, which has a radius R, and a deformation angle θ.

FIG. 2b illustrates an intersection 230b of the area of interest 210a from a point of interest 220b with a set of target patterns 240b. This intersection is external to the set of target patterns and can be used, as explained below to define the Space variable as the ratio of the surface of the intersection 230*b* to the surface of the area of interest 210*a*.

FIG. 2*c* illustrates an intersection 230*c* of the area of interest 210*a* from a point of interest 220*b* with a set of target patterns 240*b*. This intersection is internal to the set of target patterns and can be used, as explained below to define the CD variable as the ratio of the surface of the intersection 230*c* to the surface of the area of interest 210*a*.

The surface 230*b*, 230*c*, is calculated using a double integral within a subset of the area of interest 210*a* of a convolution of the target design, represented by a function of the radius and an angle, $T(r,\theta)$ with a Gaussian kernel function $K(r)$ and a deformation function $A(\theta)$:

$$S = \oiint K(r) \cdot A(\theta) \cdot T(r,\theta) \cdot dr d\theta$$

Although the modified kernel improves the sensitivity of the metrics, it still cannot be used in intensive computation, because the integral calculation $\oiint$ cannot be factorized. This limitation is still the consequence of radical changes in the boundary of subsequent integrals for each of two successive patterned designs.

As in the previous case, for a calculation of Space (visible kernel), $T(r,\theta)$ is null inside the plain parts of the layout and non-zero elsewhere.

For a calculation of CD (Blocked kernel), $T(r,\theta)$ is null outside the plain parts of the layout and non-zero elsewhere.

The domain of integration is the surface which is visible from the point of interest. This method has the advantage over the method of FIGS. 1*a*, 1*b* and 1*c* to increase the accuracy of the representation of the target design, thanks to the deformation function $A(\theta)$. This is because it better takes into account the anisotropy, which characterizes most of IC manufacturing processes (which are not only shape dependent, but also direction dependent. But, It also suffers from the same disadvantages: the limits of the domain of integration vary with each piece of the layout (i.e. with each point of interest) and that the procedure has to be repeated for all the points of interest, which may mean billions, in the case of complex layouts.

The invention corrects the disadvantages of these methods of the prior art.

Figure 3A:
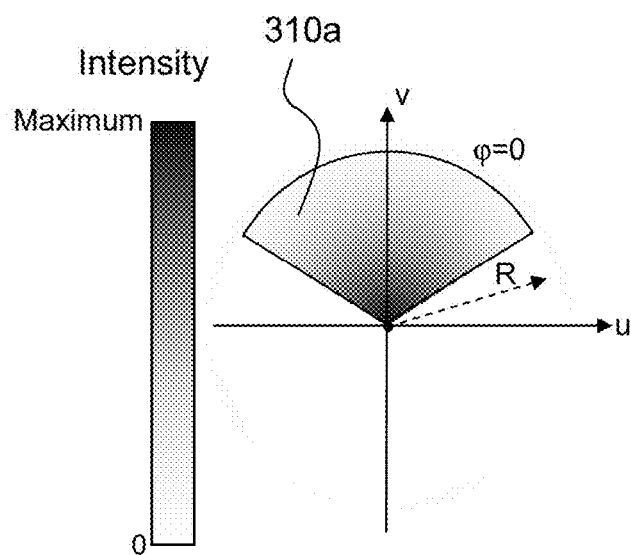
FIGS. 3a, 3b, 3c, 3d, 3e and 3f respectively represent an oriented kernel, an external density function, an internal density function, computed by convolution, with no shift angle, and three different shift angles.
Figure 3B:
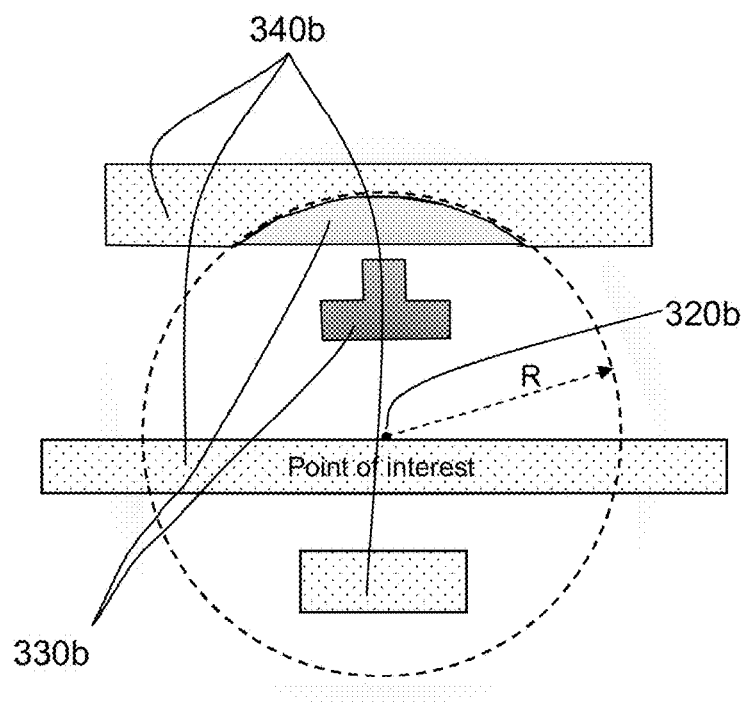
Figure 3C:
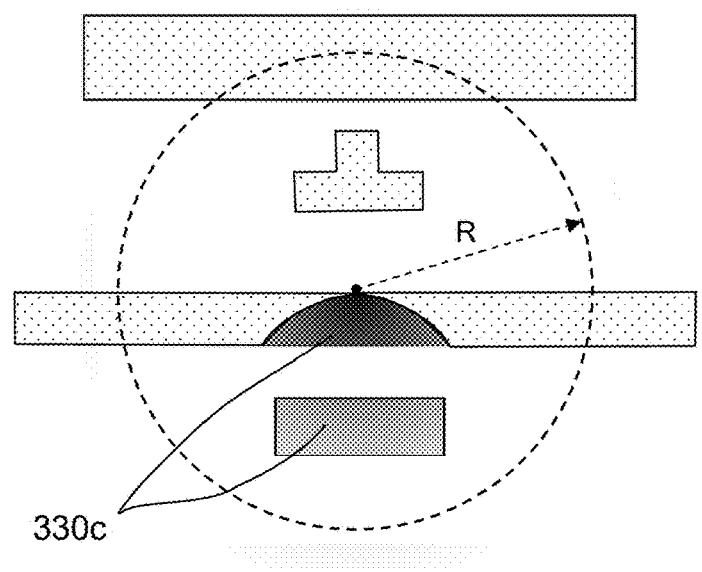

FIGS. 3*a*, 3*b* and 3*c* represent an oriented kernel, an external density function and an internal density function, in a number of embodiments of the invention.

FIG. 3*a* illustrates an anisotropic area of interest 310*a*, which has a radius R, and a deformation angle θ.

FIG. 3*b* illustrates an intersection 330*b* of the area under computation 310*a* from a point of interest 320*b* with a set of target patterns 340*b*. In this case, according to the invention, the computation extends across the whole area under computation, even though some areas are not visible from the point of interest. The result of the computation is used, as explained below to define an External Density.

FIG. 3*c* illustrates an intersection 330*c* of the area under computation 310*a* rotated by the angle φ=π from a point of interest 320*b* with a set of target patterns 340*b*. In this case, according to the invention, the computation extends across the whole area under computation, even though some areas are not visible from the point of interest. The result of the computation is used, as explained below to define an Internal Density.

In contrast to the prior art, the External Density and the Internal Density are computed as a convolution denoted by *, across the whole target design. For each point of interest (x,y), one computes a product of convolution V(x,y) of the target design, represented by a function, L(x,y) with an oriented kernel, N(x,y) as:

$$V(x,y) = L(x,y) * N(x,y)$$

The convolution product calculation is given by:

$$V(x,y) = \int_{-\infty}^{\infty} \int_{-\infty}^{+\infty} L(u,v) \cdot N(x-u, y-v) \cdot du \cdot dv \quad [\text{Eq. 1}]$$

Where the oriented kernel N(u,v) can be split into two contributions:

$$N(u,v) = K(\sqrt{u^2+v^2}) \cdot f(a \tan(v/u) + \varphi)$$

With:

$K(\sqrt{u^2+v^2})$ is the Gaussian kernel function, and $f(a \tan(v/u)+\varphi)$ s a deformation function.

The φ angle is the shift angle of the deformation function which varies according to the location (x,y) on the design.

Figure 3F:
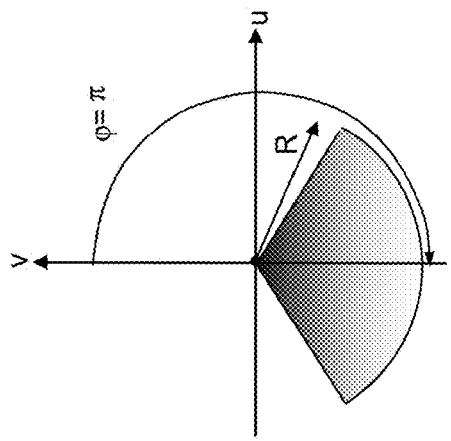
Figure 3E:
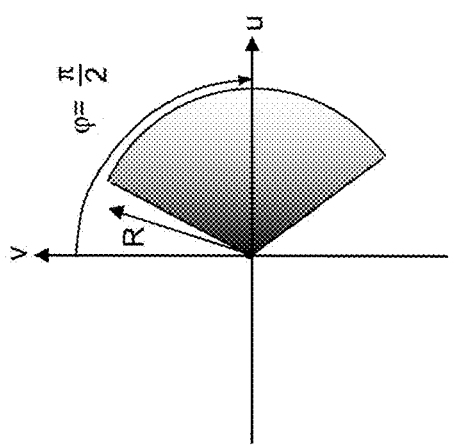
Figure 3D:
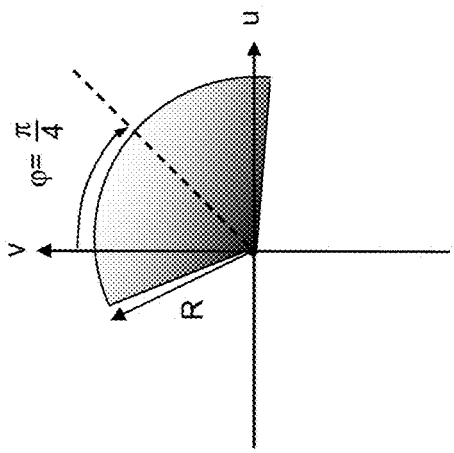

The φ angle has as reference, the axis for which the basis deformation function reaches its maximum. By way of example, we illustrate in FIGS. 3*d*, 3*e* and 3*f*, three oriented kernel configurations, shifted from the reference kernel (FIG. 3*a*). The shift angle may vary in the range [0, 2π]. Notice that φ angle has only one possible value for (x,y) location. Thus, it can be considered as constant parameter for each V(x,y) calculation.

For convenience, in the following part of the description, the N(u,v) function will be written in polar coordinates as:

$$N(r,\theta) = K(r) \cdot f(\theta + \varphi)$$

Where the radius $r = \sqrt{u^2 v^2}$, and θ=a tan(v/u).

In the case of a calculation of an External Density, f(θ+φ) is configured so that the kernel is oriented towards the outside of the pattern. Indeed if φ is replaced by φ+π, the Internal Density can be computed in parallel with External Density without further cost of calculation.

Likewise, in the case of a calculation of an Internal Density, f(θ+φ) is configured so that the kernel is oriented towards the inside of the design. Indeed if φ is replaced by φ+π, the External Density can be computed in parallel with Internal Density without further cost of calculation.

The shift angle φ is selected as the angle of view from the point of interest to the vertical axis on the design which maximizes the sensitivity of the product of convolution to the estimated metrics (Space or CD). In the case of a Manhattan patterned design (i.e. with perpendicular lines), the adequate shift angle will be π/2 (3π/2) or 3π/2 (π/2), when the point of interest is on the right (left) edge of a vertical line and the observation is respectively to the outside or the inside of the design. When the point of interest is on the bottom (top) edge of a horizontal line of a Manhattan patterned design, the adequate shift angle will be π (zero) or zero (π), when the observation is respectively to the outside or the inside of the design.

More generally, a preferred rule is that the shift angle φ of the deformation function is selected as being optimal for the area of the patterned design (Manhattan or free-form, for instance). When moving the point of interest along an edge of a patterned design, in an area where the normal to the edge can be defined (i.e. the tangent to the edge is continuous), φ is defined as the angle of the normal to the edge to the direction of reference.

At a point of discontinuity, in a preferred embodiment, the shift angle can be defined as the angle between the bisectrix of the external angle of the two segments at the point of discontinuity and the direction of reference.

Therefore, according to the invention, there is no surface integration procedure which is performed on all the parts of the design for the whole design, as is the case in the methods of the prior art. Only a single convolution function is calculated across the whole design. The computation is therefore much more efficient. Also, the External Density and the Internal Density calculations can be performed at the same time in the memory of the computer.

FIGS. 4a, 4b, 4c and 4d respectively represent a deformation function, its Fourier series development at order 4, its Fourier series development at order 2 and a deformation function shifted by a specified angle, in a number of embodiments of the invention.

Figure 4A:
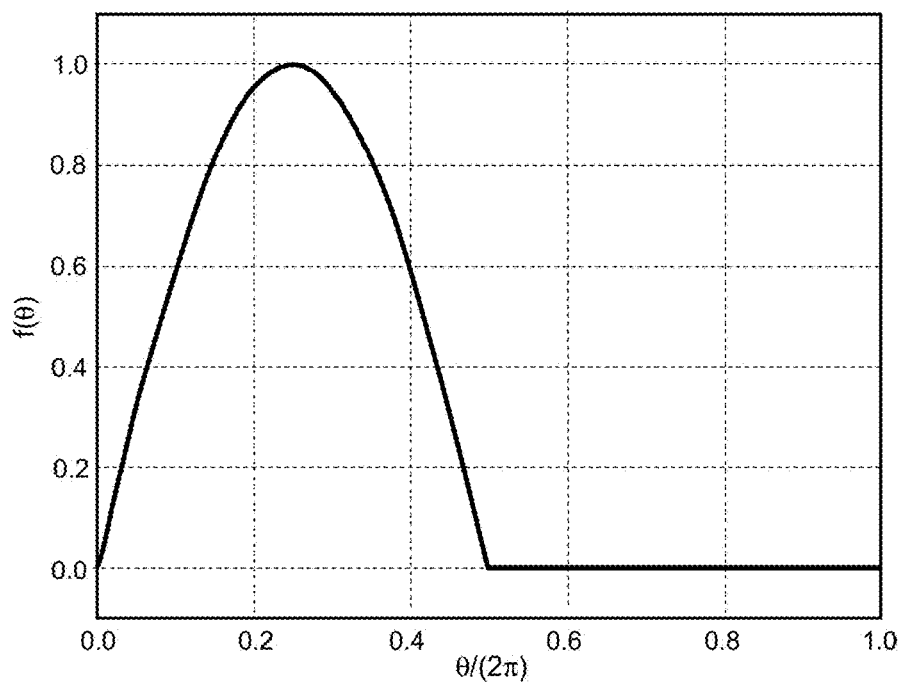
FIGS. 4a, 4b, 4c and 4d respectively represent a deformation function, its Fourier series development at order 4, its Fourier series development at order 2 and a deformation function shifted by a specified angle, in a number of embodiments of the invention.

FIG. 4a illustrates the deformation function $f(\theta+\varphi)$, with a shift angle $\varphi$ equal to zero. By way of example, only, the deformation function can be of the type illustrated on the figure, where the function $f(\theta+\varphi)$ is zero for all values of $\theta$ in the $[\pi, 2\pi]$ interval, and is positive on the $[0, \pi]$, with a maximum for $\theta=\pi/2$. In this case, $f(\theta+\varphi)$ can advantageously be a combination of truncated basic trigonometric functions. But other functions, with different values for different intervals may be selected, or different powers, as a function of the target design and the specific process to be modeled. For instance, if more directivity than the one allowed by simple trigonometric functions is needed, square or cubic sine or cosine functions can be advantageously used.

Advantageously, the deformation function $f(\theta+\varphi)$ can be replaced by its Fourier series development at order n, which is expressed by the following expressions:

$$f(\theta + \varphi) = \sum_{n=0}^{\infty} (a_n \cdot \cos(n\theta + n\varphi) + b_n \cdot \sin(n\theta + n\varphi)) \quad [\text{Eq. 2}]$$

Where the Fourier coefficients $a_n$ and $b_n$ are given by the following formulas:

$$a_n = \frac{1}{\pi} \int_0^{2\pi} f(\theta + \varphi) \cdot \cos(n\theta + n\varphi) d\theta \quad [\text{Eq. 3}]$$

And $$b_n = \frac{1}{\pi} \int_0^{2\pi} f(\theta + \varphi) \cdot \sin(n\theta + n\varphi) d\theta \quad [\text{Eq. 4}]$$

Figure 4B:
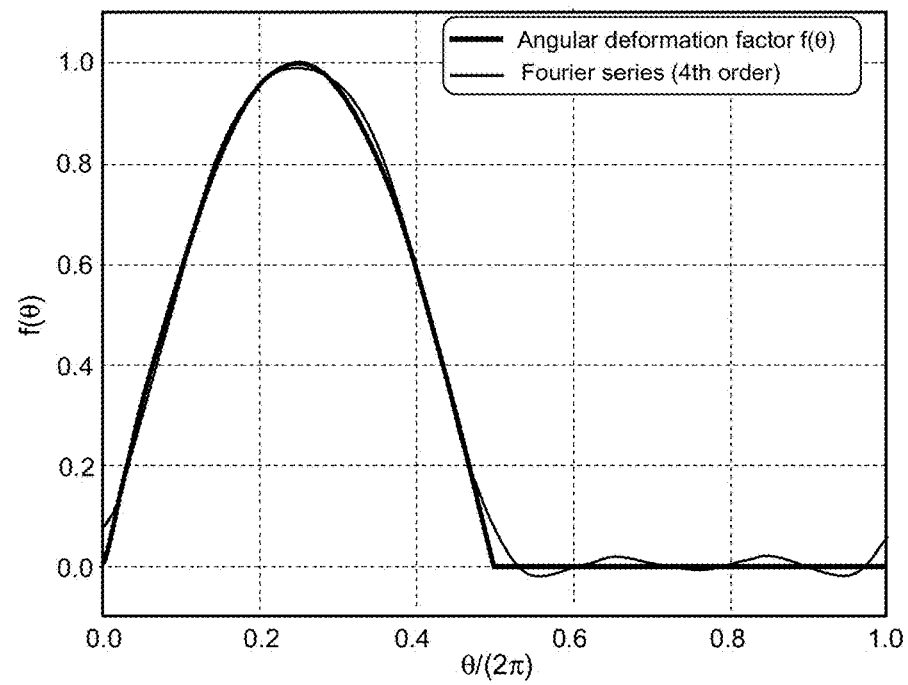

FIG. 4b demonstrates that the deformation function $f(\theta+\varphi)$ with $\varphi=0$ of FIG. 4a, is very well approximated by a Fourier series development at order 4. But another order may be selected, as a function of the specific target design and of the specific process to be modeled.

Figure 4C:
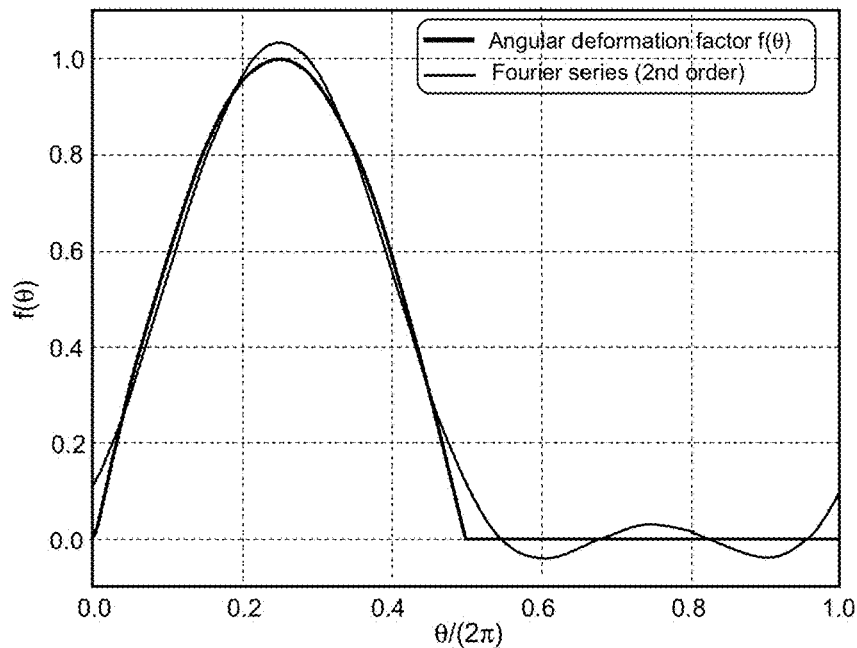

FIG. 4c represents an approximation of the same deformation function by a Fourier series development at order 2. The figure demonstrates that, in the case of this example, an order 2 development can be quite accurate. Advantageously, the order of the development will be selected so that, over a number of representative patterned designs, the approximation remains invariant by rotation within the tolerance of the correction to be modeled. And of course, the lesser the order of the development, the more efficient the computation will be.

Figure 4D:
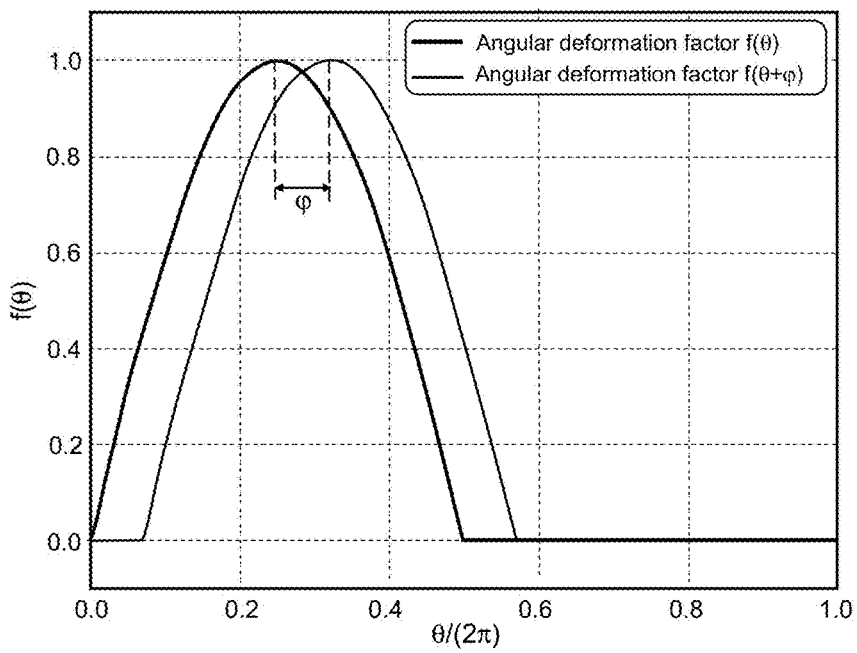

FIG. 4d illustrates an embodiment of the invention where the shift angle $\varphi$ is different from zero.

In this embodiment, the oriented metric V(x,y) is defined by Equation 1, with the same notations as defined above.

Developing the expression of V(x,y), using the Fourier series development Equations 2 and 3 above, gives the following expression:

$$V(x, y) = \sum_{n=0}^{m} \Big( (a_n \cdot \cos(n\varphi) + b_n \cdot \sin(n\varphi)) \cdot \quad [\text{Eq. 5}]$$
$$\int_{-\infty}^{\infty}\int_{-\infty}^{\infty} K\Big(\sqrt{(x-u)^2 + (y-v)^2}\Big) \cdot$$
$$\cos(n \cdot a\tan((y-v)/(x-u)) \cdot L(u, v) \cdot dudv +$$
$$(-a_n \cdot \sin(n\varphi) + b_n \cdot \cos(n\varphi)) \cdot$$
$$\int_{-\infty}^{\infty}\int_{-\infty}^{\infty} K\Big(\sqrt{(x-u)^2 + (y-v)^2}\Big) \cdot$$
$$\sin(n \cdot a\tan((y-v)/(x-u))) \cdot L(u, v) \cdot dudv\Big)$$

The integrals in the expression above do not depend on angle $\varphi$. Therefore, the integrals of Equation 5 may be pre-calculated, stored in tables, and then used in the calculation of V(x,y) with the coefficients $a_n$ and $b_n$ of the Fourier series development and the trigonometric functions of $\varphi$.

Figure 5:
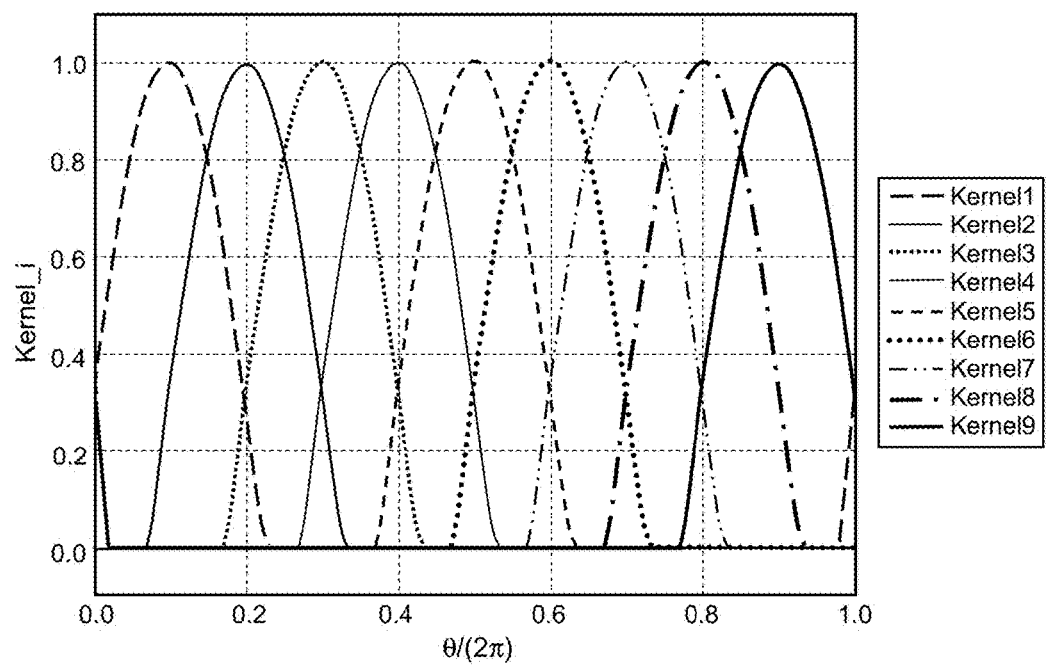
FIG. 5 illustrates a basis of 9 kernel functions used to project the product of convolution of the oriented kernel and a patterned design in a number of embodiments of the invention.

FIG. 5 illustrates a basis of 9 kernel functions used to project the product of convolution of the oriented kernel and a patterned design in a number of embodiments of the invention.

As an alternative to the development of the Fourier series as commented above, another basis of decomposition of the product of convolution V(x,y). In this exemplary embodiment, the product of convolution is decomposed into nine basic kernel functions, which can be sine or cosine functions, or among others squares or cubic functions thereof, which are all defined by a different angle. When computing the product of convolution for a definite shift angle, the two basic kernels with angles on each side of the shift angle are used to compute the product of convolution by projection on the direction of reference of the patterned design.

The figure is only illustrative of one embodiment among a plurality: for instance the number of kernels may be chosen as low as 3 or as high as a few tens, depending upon the precision which is required by the application.

The method of the invention may be used in many use cases in the manufacturing process of semiconductor ICs. More specifically, it is well suited for certain types of e-beam lithography processes to replace a method wherein the proximity effect corrections are calculated through a simulation which is decomposed in a first step wherein a convolution between a Point Spread Function (PSF) and the design and a second step wherein the resist threshold is taken into account. A more precise resist model, which can be adjusted to any type of process signature is very efficient. This is especially the case to model e-beam lithography processes after etching and/or when extreme ultra-violet (EUV) masks are used. This is because extreme UV are covered by an heavy metal layer (Tantalum or tantalium nitride) which creates significant back-scattering effects.

Also, the metrics of the invention can be used to calibrate a differential model as is disclosed by European patent application filed this same day assigned to one of the applicants, titled "Method for determining the parameters of an IC manufacturing process by a differential procedure".

This is also valid when a more precise model of the lithography step is needed, or for direct write applications.

The examples disclosed in this specification are only illustrative of some embodiments of the invention. They do not in any manner limit the scope of said invention which is defined by the appended claims.

The invention claimed is:

1. A method of determining, by a metric calculation computer, at least one component of a vector representing a metric utilized in a process for manufacturing a semiconductor integrated circuit defined by a target design, said method comprising:
   selecting at least one point of the target design as a point of interest (x,y) with the metric calculation computer;
   selecting a kernel function K(r) with the metric calculation computer centered on the at least one point of interest, said kernel function depending on a radius;
   calculating with the metric calculation computer over the target design at least one convolution of the target design and a compound of the kernel function K(r) and a deformation function $f_{x,y}(\theta, \varphi_{x,y})$, said deformation function depending on an angle of interest and a selected shift angle $\varphi_{x,y}$; and
   determining with the metric calculation computer a value of the at least one component V(x,y) from a value of a convolution function at the at least one point of interest (x,y).

2. The method of claim 1, wherein the at least one component is an external density of the target design at the point of interest, which is determined from a convolution function where the shift angle $\varphi_{x,y}$ is selected to scan outside parts of the target design from the point of interest.

3. The method of claim 1, wherein the at least one component is an internal density of the target design at the point of interest, which is determined from a convolution function where the shift angle $\varphi_{x,y}'$ is selected to scan inside parts of the design from the point of interest.

4. The method of claim 2, wherein the shift angle $\varphi_{x,y}'$ is equal to $\varphi_{x,y}+\pi$.

5. The method of claim 1, wherein the kernel function is an isotropic function.

6. The method of claim 5, wherein the kernel function is a Gaussian function.

7. The method of claim 1, wherein the deformation function is a compound of trigonometric functions selected to be null for values of the angle of interest higher than $\pi$.

8. The method of claim 1, wherein the deformation function is a compound of one of squares and cubic powers of trigonometric functions selected to be null for values of the angle of interest higher than $\pi$.

9. The method of claim 1, wherein the deformation function is replaced by a Fourier series development.

10. The method of claim 9, wherein the Fourier series development is developed at a $n^{th}$ order, n being selected so that the product of convolution developed at the $n^{th}$ order is invariant across rotations around the point of interest, within a tolerance of the corrections to be applied to the target design.

11. The method of claim 1, wherein the deformation function is replaced by a projection of a couple of basic kernel functions, said basic kernel functions with angular variations selected to scan the domain of variation of the shift angle $\varphi_{x,y}$ across the target design.

12. The method of claim 11, wherein the couple of basic kernel functions are selected so that the two selected basic kernel functions have angular variations which are above and under shift angle $\varphi_{x,y}$.

13. The method of claim 1, further comprising:
   outputting the value of the at least one component to semiconductor manufacturing equipment,
   wherein the semiconductor manufacturing equipment is configured for one of direct writing on semiconductor wafers, writing on a mask plate, etching, chemically or mechanically planarizing, or baking, annealing a semiconductor wafer, and inspecting a mask or semiconductor surface.

14. A non-transitory computer program for determining at least one component of a vector representing a metric utilized in a process for manufacturing a semiconductor integrated circuit defined by a target design, said non-transitory computer program being executed by a metric calculation computer and comprising:
   computer code for selecting at least one point of the target design as a point of interest;
   computer code for selecting a kernel function centered on the at least one point of interest, said kernel function depending on a radius;
   computer code for calculating over the target design at least one convolution function of the target design and a compound of the kernel function and a deformation function, said deformation function depending on an angle of visibility and a selected shift angle; and
   computer code for determining a value of the at least one component from a value of a convolution function at the at least one point of interest.

15. A semiconductor manufacturing equipment configured to use at least an output of a computer program according to claim 14, said semiconductor manufacturing equipment configured for one of direct writing on semiconductor wafers, writing on a mask plate, etching, chemically or mechanically planarizing, or baking, annealing a semiconductor wafer, and inspecting a mask or semiconductor surface.

16. The non-transitory computer program of claim 14, further comprising:
   computer code for outputting the value of the at least one component to semiconductor manufacturing equipment,
   wherein the semiconductor manufacturing equipment is configured for one of direct writing on semiconductor wafers, writing on a mask plate, etching, chemically or mechanically planarizing, or baking, annealing a semiconductor wafer, and inspecting a mask or semiconductor surface.

* * * * *